Patented Apr. 2, 1929.

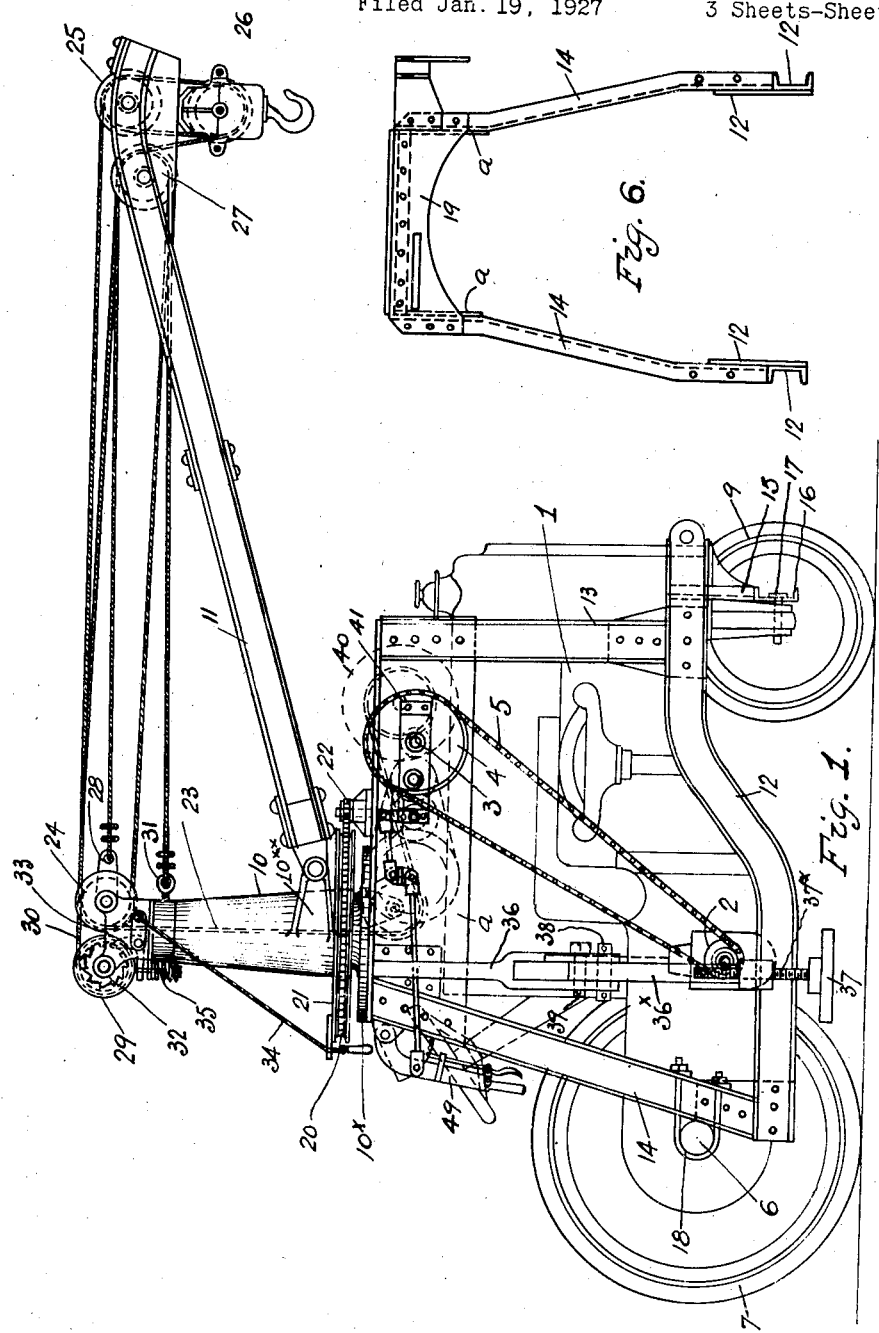

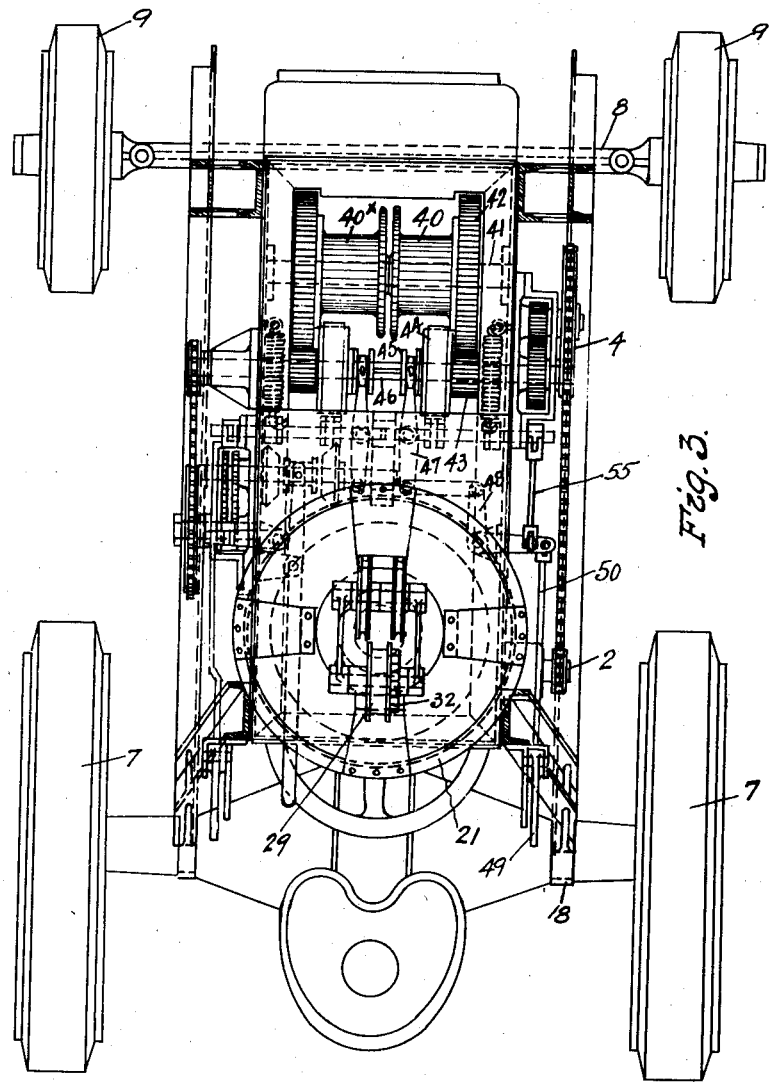

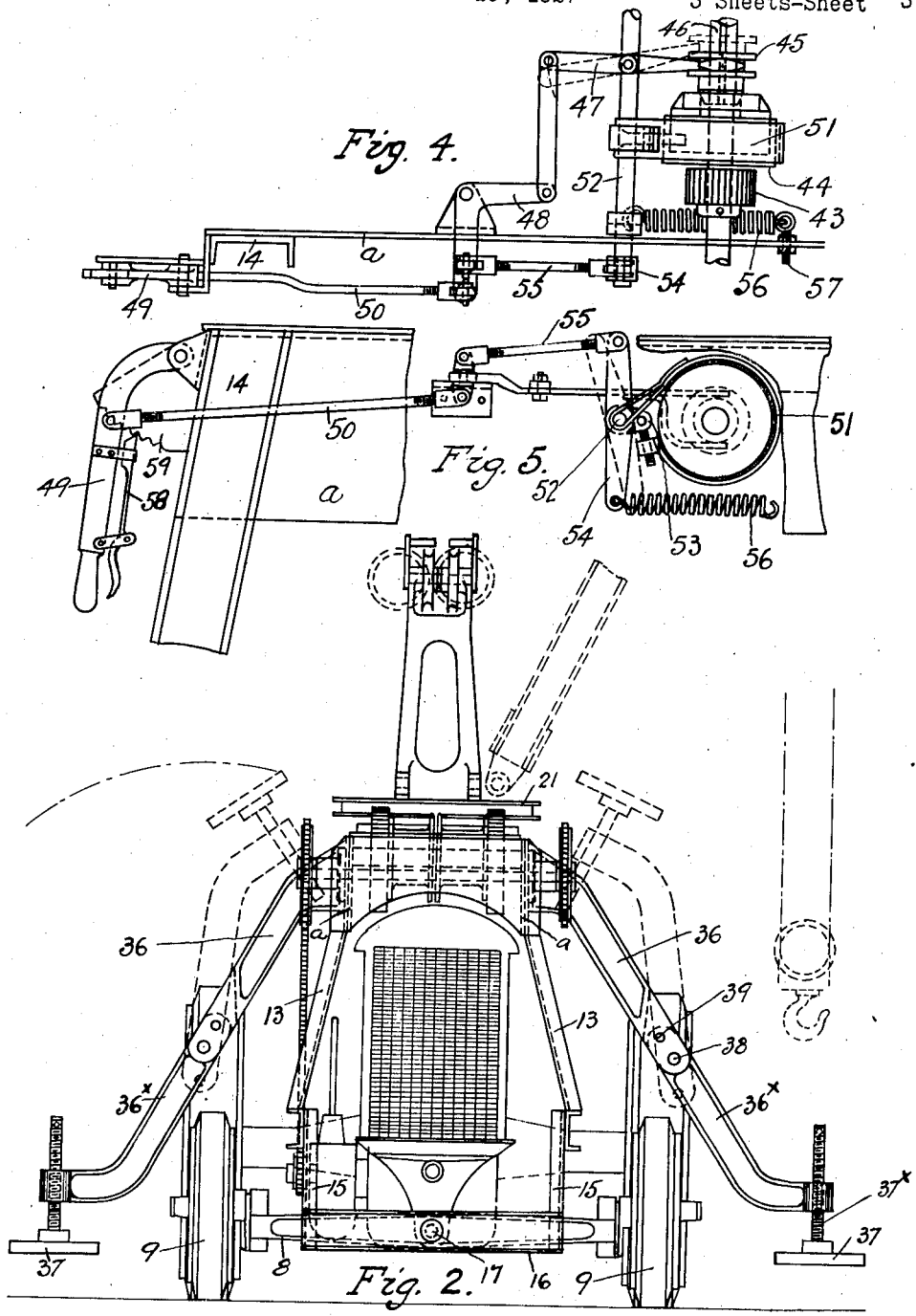

1,707,518

UNITED STATES PATENT OFFICE.

THORVALD N. GARSON, OF NEW BRIGHTON, NEW YORK.

HOISTING DEVICE.

Application filed January 19, 1927. Serial No. 162,025.

The object of the present invention is to provide mobile hoisting apparatus which shall comprise a wheeled power device and supporting elements for the hoisting members per se so arranged as to permit their application to various types of truck and tractor chassis and throughout retaining marked stability and strength; a feature of the apparatus being the provision and means for throwing part of the load exteriorly of the chassis particularly at the intervals of greatest stress, that is to say when the hoisting apparatus institutes the movement of a load and carries the same toward the centre of gravity of the chassis.

The invention will be understood by reference to the accompanying drawings in which—

Figure 1 is a side elevation of an embodiment of the invention, and

Figures 2 and 3 are respectively a front elevation and a plan view of said embodiment;

Figures 4 and 5 are respectively plan and side elevations of a combined clutch and brake mechanism for the hoisting device;

Figure 6 is a rear view of the frame member.

Referring to the drawings I have therein illustrated a wheeled power device, specifically a tractor, the engine being located at 1 and having suitable drive connections with a pulley 2 from which power is delivered to a shaft 3 through sprocket wheel 4 (indicated diagrammatically) and chain 5. The tractor is provided with a rear axle 6 and rear wheels 7. At its front the tractor is provided with a front axle 8 and front wheels 9.

The hoisting elements comprise a rotatable mast 10 formed with a projecting arm 10×× affording a pivotal support for a boom 11. The hoisting mechanism is carried by a frame having a three-point connection with the tractor, the frame comprising the two side longitudinal members a, the front risers 13 and the rear risers 14. The risers 13 are at their lower ends connected to the uprights 15 which in turn are rigidly connected to the cross member 16 and the latter is pivoted at 17 to front axle 8. Each rear riser 14 is connected by means of a strap 18 to rear axle 6. The opposed longitudinal top frame members a may be connected by cross plates such as 19, Figure 6.

Suitable plates may be bolted upon the upper horizontal frame members so as to form a support for a standard $10^x$ upon which the revoluble mast 10 is mounted. The mast may be revolved by any suitable means, as for example a chain 20 encircling a bull-ring 21 and driven by a sprocket 22 which in turn is driven from the source of power through any suitable clutch mechanism which permits its operation whenever required.

The means for raising and lowering the load comprise a cable 23 which passes through the hollow mast and standard and thence passes over a sheave 24, thence over a sheave 25 at the end of the boom from which point it passes around the hook-block sheave 26 and thence either directly or after a second turn around the sheaves 25, 26 over a guide pulley or sheave 27 and thence to an anchorage as at 28. Cable 23 is led from below hollow standard $10^x$ to a drum provided with mechanism for clutching it to a shaft rotated from the source of power, as more particularly described in my co-pending application filed February 20, 1926, Serial No. 89,530.

Means are provided for automatically latching the boom in a position to which it may be moved by the hoist rope, said means, in the present instance, comprising a drum 29 controlled in its action by a coiled spring (not shown). Connected to the drum is a cable 30, the cable being led around sheave 27 at the end of the boom and thence being connected to a fixed point as at 31. As the boom is raised the spring rotates drum 29 and a latch device comprising ratchet wheel 32 and pawl 33 will prevent reverse rotation of the drum unless the pawl is released by a cable 34, the pawl being normally held in position by spring 35. Thus the boom is automatically held in any position to which it may be raised and a reverse movement of hoisting rope 23 will lower the load without lowering the boom.

When loads are being raised by the boom, the greatest strain will be thrown upon the lower portions of the frame, particularly at their connections with the chassis, at the instant of hoist and until the load reaches its maximum movement toward the centre of gravity of the device. The reason for this is, of course, that the boom, being weighted at its end by the load, acts as a lever upon the device as a whole and a major stress is thrown laterally. The present invention provides means for throwing such lateral stresses largely to a point exterior of the chassis and lower portions of the frame. To this end I provide at each side of the frame one or more downwardly and outwardly extending legs 36 and each leg is preferably formed with a hinged extension 36× which may contact with the ground either directly or through the intermediary of an adjustable foot 37. In the present instance foot 37 is a flat, broad plate located at the base of a screw 37× threaded within extension 36× so that its height may be readily regulated. Extension 36× is hinged in such manner that it may be held entirely rigid when in lowermost position. For example, the hinge may comprise a pivot bolt 38 and the extension and leg may be provided with aligned apertures 39 through which a pin may be passed to lock the two in rigid relationship. When not in use, the leg extension may be swung upwardly to the dotted line position, Figure 2.

It will be noted that the frame is so devised as to embrace the tractor, partake of its axial support, have the advantages of a three-point suspension of the tractor chassis, whether or not the tractor is so suspended, and the combination enables the throwing of heavy stresses laterally of the chassis in substantial degree. As a matter of fact, by jacking up the tractor through the intermediary of the adjustable feet 37, assuming that two sets are employed, one at the front and one at the rear of the frame, all of the hoisting stresses may be imposed upon the upper portion of the frame and the legs 36, 36×.

The hoist cable may be led to a drum 40 loosely mounted on a shaft 41 and provided with a gear wheel 42 in mesh with a pinion 43 carried by the outer member 44 of a clutch device which includes an inner member 45 keyed to shaft 46 and adapted to be moved into engagement with the outer member by a clutch actuating lever 47, which in turn is actuated by a rock-lever 48 adapted to be manually operated by a hand lever 49 through the intermediary of a link rod 50. For convenience of illustration the clutch operating members are shown more in detail in Figures 4 and 5.

Encircling the outer clutch member 44 is a brake band 51 having one end strapped to a shaft 52 and the opposite end adjustably connected to a brake arm 53 on shaft 52. Shaft 52 has rigidly connected thereto an arm 54 connected by a link 55 with link 50. At the lower end of arm 54 is a spiral spring 56 which is connected at 57 to a fixed member of the frame. The spring serves to normally maintain the brake band tightened about the clutch member. When the parts are in the position shown in full lines, Figure 5, the brake is released. When handle lever 49 is moved outwardly, spring 56 aids the manual movement in applying the brake, and simultaneously therewith lever 47 is rocked to release the clutch. When, however, hand lever 49 is moved inwardly the clutch is applied and the brake released, said movement imparting a tension to spring 56 so that the latter is placed in condition for immediate braking action. A pawl and ratchet device 58, 59 may be employed to hold hand lever 49 against the tension of spring 56.

From inspection of Figure 3 in the drawings it will be seen that the relationship of the frame members enables the employment of a second drum 40× which may be driven through clutch mechanism exactly in the same manner as the first drum. The specific drive mechanism forms no part of the present invention and further explanation thereof is unnecessary.

Having described my invention what I claim and desire to secure by Letters Patent is as follows:—

In a hoisting device, a box-like frame having a substantially horizontal top, a standard mounted on said top, a mast revoluble co-axially with the standard, a boom carried by the mast near the base thereof, means for raising and lowering the boom including a hoist rope passing through the standard, a drum within said frame and means for rotating and controlling the rotation of the drum, opposed depending legs attached to the rear of said frame, substantially vertical opposed depending legs attached to the front of said frame, a lower side longitudinal frame member directly connected to the legs at each side of the frame and extending rigidly and forwardly beyond said legs, means for securing the rear legs of the frame to the axle housing of a tractor chassis, and means for securing the front legs of said frame to the tractor chassis at a point enabling rocking motion of the front axle without affecting the position of the frame, said means comprising a cross member pivoted to said axle and uprights extending at each longitudinal end thereof and each upright directly connected to one of said side members at the rigid extension thereof.

In testimony whereof, I have signed my name to this specification.

THORVALD N. GARSON.